United States Patent [19]

Yamashita et al.

[11] Patent Number: 5,345,345
[45] Date of Patent: Sep. 6, 1994

[54] ROTARY HEAD TYPE MAGNETIC RECORDING/REPRODUCING UNIT

[75] Inventors: Tatsumaro Yamashita; Seiichi Nagai, both of Shibata, Japan

[73] Assignee: Alps Electric Co., Ltd., Tokyo, Japan

[21] Appl. No.: 94,655

[22] Filed: Jul. 19, 1993

Related U.S. Application Data

[63] Continuation of Ser. No. 655,511, Feb. 12, 1991, abandoned.

[30] Foreign Application Priority Data

Mar. 6, 1990 [JP] Japan .................................. 2-54673

[51] Int. Cl.$^5$ ............................................ G11B 15/14
[52] U.S. Cl. ........................................ 360/64; 360/84; 360/72.3
[58] Field of Search .................. 360/84, 85, 27, 72.03, 360/64, 71, 83

[56] References Cited

U.S. PATENT DOCUMENTS

| | | | |
|---|---|---|---|
| 4,837,640 | 6/1989 | Ozaki et al. | 360/72.03 |
| 4,922,359 | 5/1990 | Nakamura | 360/84 |
| 5,018,036 | 5/1991 | Yamashita | 360/84 |
| 5,038,234 | 8/1991 | Abeille | 360/84 |
| 5,063,466 | 11/1991 | Yamashita | 360/84 |

*Primary Examiner*—Robert J. Pascal
*Assistant Examiner*—Tan Dinh
*Attorney, Agent, or Firm*—Guy W. Shoup; Patrick T. Bever

[57] ABSTRACT

According to the invention, there is provided a rotary head type magnetic recording/reproducing unit comprising a drum for receiving in close contact a magnetic tape on its periphery and a pair of magnetic heads arranged on the drum for running slantly on the magnetic tape for recording or reproduction of signals, wherein the span of contact of the drum's periphery and the magnetic tape is greater than that of a signal recording or reproducing operation on the magnetic tape by either of the magnetic heads. With such an arrangement, signal recording or reproducing operations of the unit can be conducted under a condition where the tape and the magnetic head are stably in contact with each other and therefore any distorted or deformed envelope waveforms may be eliminated.

12 Claims, 5 Drawing Sheets

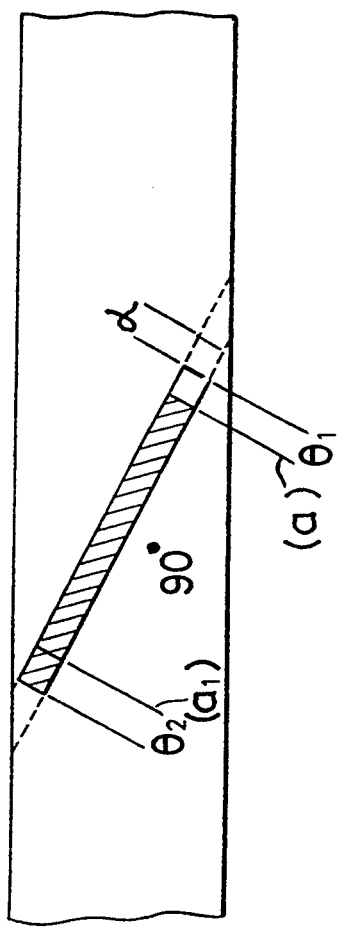
FIG.2
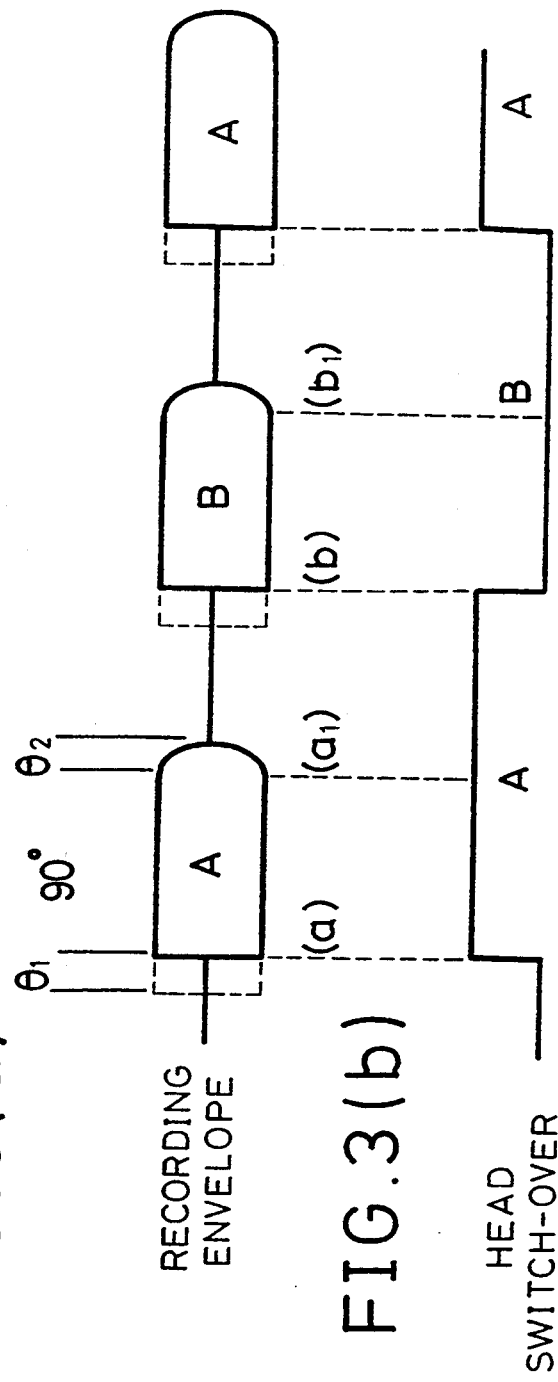
FIG.3(a)
FIG.3(b)

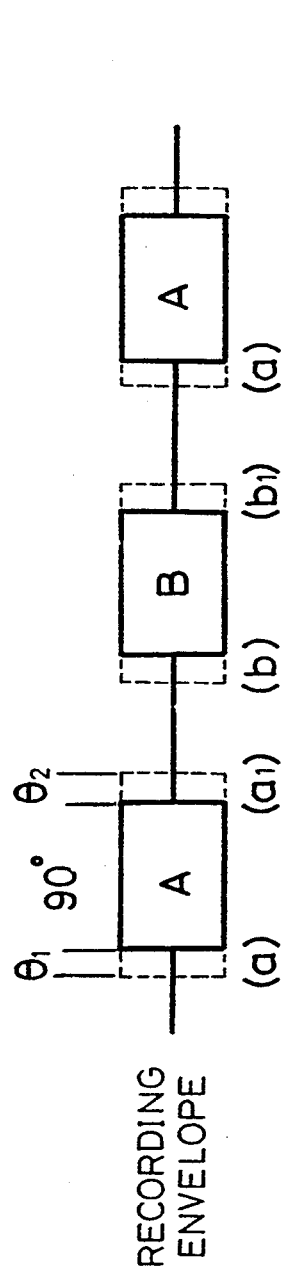
FIG.5(a) RECORDING ENVELOPE
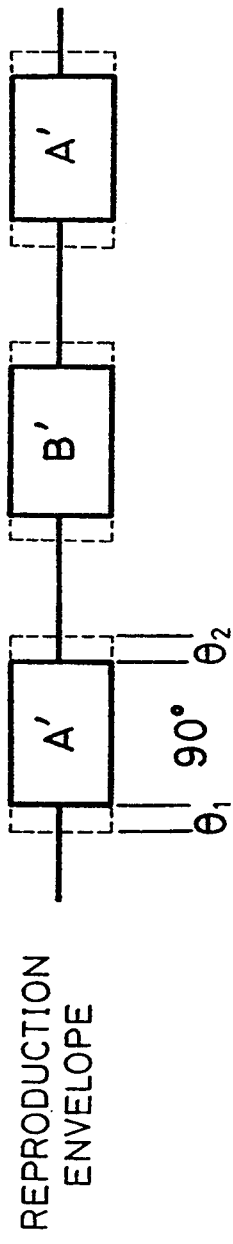
FIG.5(b) REPRODUCTION ENVELOPE

RECORDING ENVELOPE

HEAD SWITCH-OVER

ROTARY HEAD TYPE MAGNETIC RECORDING/REPRODUCING UNIT

This application is a continuation of application Ser. No. 07/655,511, filed Feb. 12, 1991 and now abandoned.

BACKGROUND OF THE INVENTION

1. Field of the Invention

This invention relates to a rotary head type magnetic recording/reproducing unit to be used for a DAT or digital VTR machine and, more particularly, it relates to a rotary head type magnetic recording/reproducing unit provided with a control means for stabilizing envelope waveforms at the starting point or the ending point or both the starting and ending points of each envelope waveform during recording or reproducing operation.

2. Prior Art

FIG. 6 of the accompanying drawings shows a plan view of the rotary head section of a rotary head type magnetic recording/reproducing unit to be used for a DAT machine.

In a DAT machine, there are provided a pair of magnetic heads A and B arranged on a rotary drum 1a of a rotary head unit 1. When the rotary drum of a DAT machine has a diameter of 30mm, magnetic tape T is driven past the rotary drum while it is in frictional contact with the drum's periphery over a distance that corresponds to a central angle of 90°. In practice, however, a tolerance of some 0.5 to 1.5° is given to the both ends of the tape on the contact area of the drum's periphery in view of the accuracy of operation of the tape loading and driving mechanism. FIG. 7 is a plan view of a magnetic tape schematically illustrating how signals are recorded on a tape. In FIG. 7, the hatched area is the area where signals are recorded in one recording operation (or the area that corresponds to the central angle of 90° plus said tolerances).

FIG. 8(a) illustrates envelope waveforms for signals recorded on the tape and FIG. 8(b) shows the timing switch-over from the magnetic head A to the magnetic head B. With a rotary head type magnetic recording/reproducing unit of a DAT machine as illustrated in FIG. 6, since each of the magnetic heads A and B covers an operating range 90°, the recorded signals show intermittently arranged waveforms where a void angle of 90° takes place for every 180° rotation of the drum. Conventionally, the switch-over from the head A to the head B or vice versa is conducted in each void angle as seen from FIG. 8(b).

As the switch-over from the head A to the head B or vice versa takes place in a conventional DAT machine at a timing as illustrated in FIG. 8(b) and described above, the head A, for example, carries out a recording operation while the tape is running for a distance that corresponds to a central angle of 90° and then, after an intermission of 90°, the head B takes the role of recording signals all the way as the tape is running for a same distance that also corresponds to a central angle of 90°.

With a known rotary head type magnetic recording/reproducing unit as described above, however, there arises a problem of distorted or deformed envelope waveforms at every start of recording operation as seen from FIG. 8(a) because of unstable contact between the magnetic head and the tape that can occur in the initial stages contact where the tape comes to touch and frictionally move on the magnetic head. A similar problem occurs when the tape leaves the magnetic head or at the ending point of an envelope waveform for an obvious reason. Distorted envelope waveforms can very often result in inaccurate recording or reproduction of signals and clock synchronization of signals can be severely affected particularly when the envelope waveform is distorted in the initial stages.

There have been proposed measures that address the problem of distortion or deformation of envelope waveforms. For instance, Japanese Patent Disclosure, Tokkou Shou, No. 59-14812 teaches a method of suppressing distortion of envelope waveforms by eccentrically arranging the gaps between the magnetic heads. However, since such a method requires specifically designed magnetic heads, the overall cost of a DAT machine comprising such heads can be significantly higher than an ordinary DAT machine, although it is not completely free from the problem of distorted envelope waveforms.

It is therefore an object of the present invention to solve the above problem by providing a rotary head type magnetic recording/reproducing unit which is free from the problem of distorted envelope waveforms at the starting point or the ending point or both the starting and ending points of each envelop waveform during recording or reproducing operation by simply specifying the central angle of contact of each of the magnetic heads relative to the recording tape and the timing of head switch-over.

SUMMARY OF THE INVENTION

According to the invention, the above object of the present invention is achieved by providing a rotary head type magnetic recording/reproducing unfit comprising a drum for receiving in close contact a magnetic tape on its periphery and a pair of magnetic heads arranged on said drum for running slantly on the magnetic tape for recording or reproduction of signals, wherein the span of contact of the drum's periphery and the magnetic tape is greater than that of a signal recording or reproducing operation on the magnetic tape by either of the magnetic heads.

With an arrangement as described above, the tape comes to contact with the drum earlier than the start of a signal recording or reproducing operation by either of the heads and leaves the drum later than the end of the operation. In other words, the central angle of contact of the drum's periphery and the tape is greater than the central angle required for signal recording or reproduction. The difference between the two angles can be made significantly great in view of a safety margin for the magnetic head to come to contact the tape and establish a stable relationship with it in terms of signal recording and reproduction. If a DAT machine has a drum with a diameter of 30mm, the upper limit for the margin can be approximately somewhere between 15° and 20° while the lower limit for the margin is preferably approximately 3°. By providing such a marginal angle for the start of a signal recording or reproducing operation, the magnetic head is allowed to have a safety zone covering the span between the start of contact with the magnetic tape and the start of signal recording or reproduction in order to avoid any distorted envelope waveform as illustrated in FIG. 8(a). Likewise, since a marginal angle is provided for the end of a signal recording or reproducing operation, the magnetic head is allowed to have a safety zone covering the span between the end of signal recording or reproduction and the end of contact with the magnetic tape so that any distorted envelop waveform may be eliminated.

As a consequence, the central angle for the contact area of the drum with the tape is considerably greater than the central angle for the recording or reproducing operation of the magnetic head, the excess providing a safety margin for the rotary head type magnetic recording/reproducing unit so that the position of the tape loading post for bringing the magnetic tape into contact with the drum may be appropriately determined within an allowable range, leaving a considerable freedom for the layout of the machine and eliminating possible operational interferences among components.

Now the present invention will be described in greater detail by referring to the accompanying drawings that illustrate preferred embodiments of the invention.

BRIEF DESCRIPTION OF THE INVENTION

FIG. 2 is a partial plan view of a magnetic tape showing a signal recording area of the tape when it is used with the embodiment of FIG. 1.

FIG. 3(a) shows the envelope waveforms of some of the signals recorded on the magnetic tape of FIG. 1.

FIG. 3(b) is a timing chart for head switch-over of the embodiment of FIG. 1.

FIG. 5(a) shows the envelope waveforms of some of the signals recorded on the magnetic tape of FIG. 4.

FIG. 5(b) shows the envelope waveforms of some of the signals reproduced from the magnetic tape of FIG. 4.

DETAILED DESCRIPTION OF THE INVENTION

Figure 1:
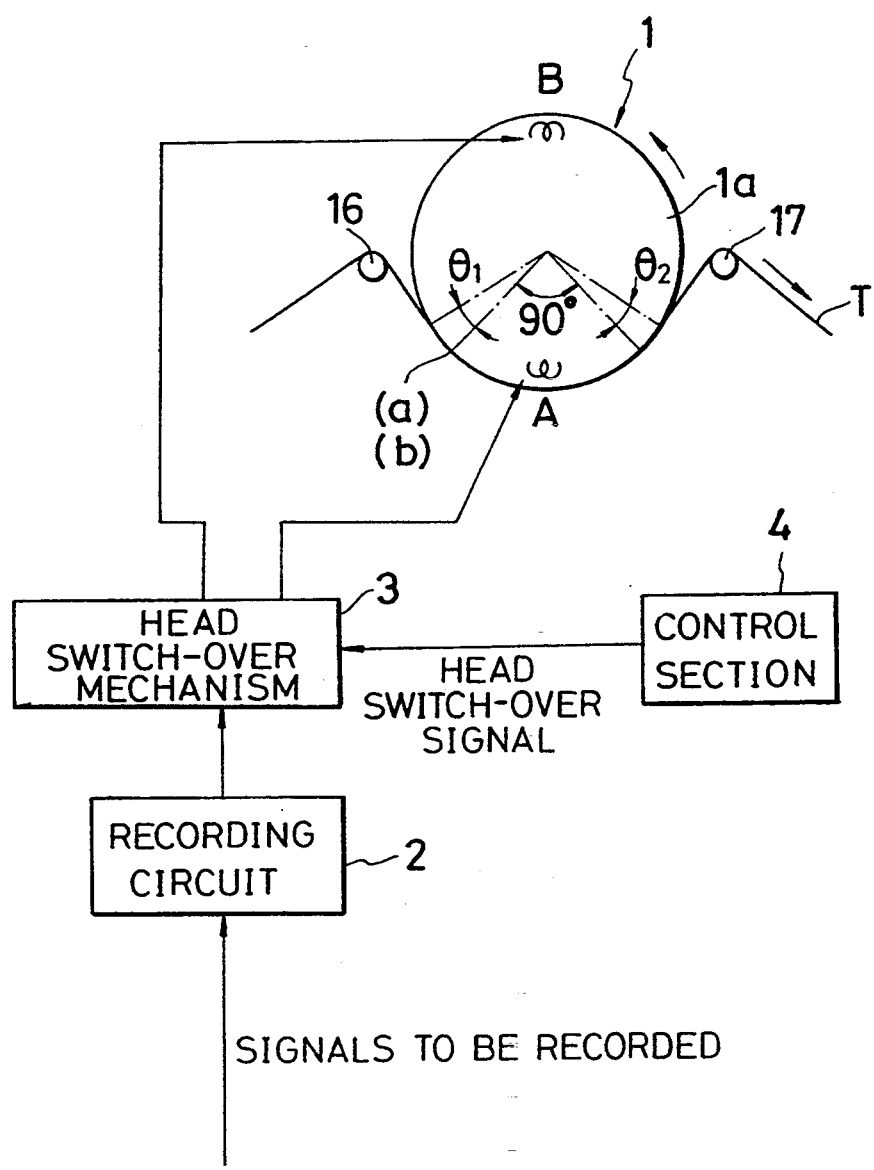
FIG. 1 is a block diagram of a preferred embodiment of the invention illustrating in particular the positional relationship between the drum and the magnetic tape.

Referring to FIGS. 1 through 3(b) that illustrate a first embodiment of the invention, which is in fact a rotary head type magnetic recording/reproducing unit of a DAT machine, it comprises a rotary drum 1a of a rotary head assembly 1 having a diameter of 30mm. A pair of magnetic heads A, B are arranged on the rotary drum 1a. Each of the magnetic heads A, B is used for both signal recording and reproduction, although only the route of signals for recording operation is shown in FIG. 1 and the route of signals for reproducing operation is omitted.

In FIG. 1, reference numeral 2 denotes a recording circuit to be used for amplifying the signals transmitted from a signal processor (not shown) for recording. Reference numeral 3 denotes a head switch-over mechanism 3 for switching from the head A to the head B or vice versa. Reference numeral 4 denotes a control section 4 or a CPU that controls the overall operation of the rotary head type magnetic recording/reproducing unit. The control section 4 determines the timing of head switch-over in accordance with the PG signal coming from a drive motor for driving the rotary drum 1a to rotate and transmits a head switch-over signal to the head switch-over mechanism 3.

Each of reference numerals 16 and 17 denotes a loading post. The loading posts 16 and 17 take magnetic tape T out of a cassette half and apply it to the periphery of the rotary drum 1a of the rotary head assembly 1. If the rotary drum 1a of a DAT machine has a diameter of 30mm, the magnetic head records signals on the tape T for a span that corresponds to a central angle of 90° of the drum in one recording operation. In the embodiment of FIG. 1, however, marginal angles $\theta 1$ and $\theta 2$ are provided respectively at the front and rear edges of the 90° so that the tape T is in contact with the periphery of the rotary drum 1a for a span that corresponds to a central angle of $(90° + \theta 1 + \theta 2)$ of the drum. In FIG. 2 showing a part of the magnetic tape T, the hatched area is the area that contacts either of the magnetic heads A, B for one recording operation. As shown in FIG. 2, a leading marginal contact area that corresponds to the angle $\theta 1$ is located immediately before the recording area that corresponds to 90° and a trailing marginal contact area that corresponds to the angle $\theta 2$ is located immediately after the recording area.

Now, the timing of head switch-over will be described by referring to FIG. 3. It should be noted that this embodiment is so designed that distortion of envelope waveforms is eliminated only at the front end, leaving the rear end of each of the envelope waveforms subject to distortion. Therefore, the angle $\theta 2$ for the trailing marginal contact area will be determined to be between 0.5 and 1.5° as in the case of a conventional DAT machine. In other words, the angle $\theta 2$ has a value determined only in consideration of the degree of operational accuracy of the tape loading mechanism and therefore signals may be recorded on this trailing marginal contact area. On the other hand, the angle $\theta 1$ for the leading marginal contact area, which is not used for signal recording, is preferably greater than 3°, a value considerably larger than its counterpart of any known DAT machine which is normally determined to be between 0.5 and 1.5° in consideration of the degree of operational accuracy of the tape loading mechanism, and can be theoretically as great as approximately 20.3° if the tape contacts with the periphery of a drum having a diameter of 30mm for a distance corresponding to a central angle of 90°. However, the maximum value for $\theta 1$ will be somewhere between 15° and 19° to provide a safety zone (see a in FIG. 2) for preventing damage to a lateral edge (lower edge in FIG. 2) of the tape that can be made when the magnetic head comes to abut it.

FIG. 3(b) shows a timing chart for head switch-over to be effected by head switch-over signals. The timing of head switch-over corresponds to the leading edge (a) of a recording zone of the tape shown in FIG. 2. The head A, for instance, is set to the recording mode when it reaches the leading edge (a) of a recording zone that corresponds a central angle of 90° of the drum and then head switch-over takes place when the head B reaches the leading edge (b) of the succeeding recording zone when it is set to the recording mode.

Figure 8A:
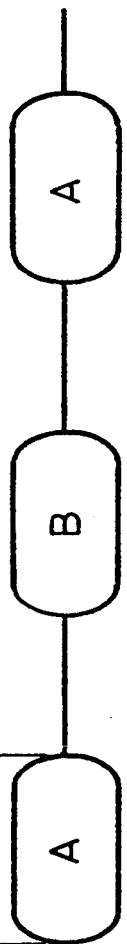
FIG. 8(a) shows the envelope waveforms of some of the signals recorded on the magnetic tape of FIG. 6.

With the above described embodiment, therefore for instance, the magnetic head A which is circularly moved on the rotary drum 1a does not perform any recording operation when it comes to contact the tape T and eventually reaches the leading marginal contact area $\theta 1$ of the tape T as shown in FIG. 2. Thereafter, it starts a recording operation only when it reaches the leading edge (a) of a recording area that corresponds to a central angle of 90° of the drum. The same applies to the magnetic head B at the leading edge (b) in FIG. 3(a). The leading marginal contact area $\theta 1$ ensures that any recording operation can be initiated under a condition where the magnetic head and the magnetic tape stably contact with each other so that the envelope waveforms of the signals recorded on the tape are free from distortion at the start of recording. The difference between the envelope waveforms of this embodiment and those of a conventional DAT machine may be clearly understood by comparing FIG. 3(a) and FIG. 8(a).

Figure 8B:
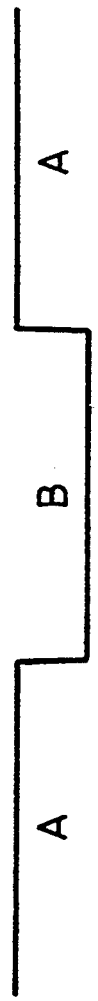
FIG. 8(b) is a timing chart for head switch-over of the drum of FIG. 6.

The envelope waveforms of the embodiment of FIGS. 1 through 3(b), however, are accompanied by distortion at the end of recording because the operation of head switch-over is conducted in a manner similar to that of a conventional DAT machine at the end of recording as illustrated in FIG. 8(b). More specifically, the trailing marginal contact area $\theta 2$ of this embodiment is similar to that of a conventional DAT machine provided to accommodate operational errors of the tape loading mechanism and therefore signals may be recorded in this area to generate an envelope waveform which is possibly distorted at its rear end. It should be noted, however, that the provision of $\theta 2$ may not be necessary when the tape loading mechanism operates with high precision and therefore errors are scarcely involved in the running operation of the magnetic tape.

Since envelope waveforms are more liable to be distorted at the start of recording than at the end of recording as described above, the accuracy of recording and reproduction can be remarkably improved by providing a measure of preventing distortion only at the start of signal recording and reproduction.

While the functional features of the embodiment are described above only in terms of recording operation, the same description principally applies to the switch-over operation of the heads A and B of the embodiment to be effected by head switch-over timing signals as illustrated in FIG. 3(b). Here again, although the magnetic head A or B is in contact with the magnetic tape at the zone $\theta 1$, it does not reproduce any signals and starts reproducing recorded signals only when it reaches the related starting edge (a) or (b) so that the operation of signal reproduction may be conducted after the contact between the head and the tape is kept under a stable condition and the reproduced envelope may be free from distortion at the start.

By selecting a value for $\theta 2$ approximately equal to that of $\theta 2$ for the embodiment of FIGS. 1 and 2, there may be provided a trailing marginal contact area, which is not used for signal recording, for each recording zone of the tape in order to ensure safe head switch-over operation at the rear edges (a1) and (b1) of the recording zones, or envelope waveforms in FIG. 3(a), each corresponding to a central angle of 90°. With such an arrangement, envelope waveforms become free from any distortion and deformation at the end as well as at the start. Note that with the arrangement, the central angle that corresponds to the peripheral area of the drum in contact with the magnetic tape can be as large as $(90° + 19° + 19°) = 130°$ for a central angle of 90° of the drum corresponding to each recording area of the tape. This means that any specific arrangement is not required to accommodate operational errors of the tape loading mechanism and, therefore, the mechanism can be of a relatively simple configuration. Besides, the loading posts 16 and 17 in FIG. 1 are given a considerable freedom for positioning and possible operational interferences among components of the machine are remarkably eliminated.

Figure 4:
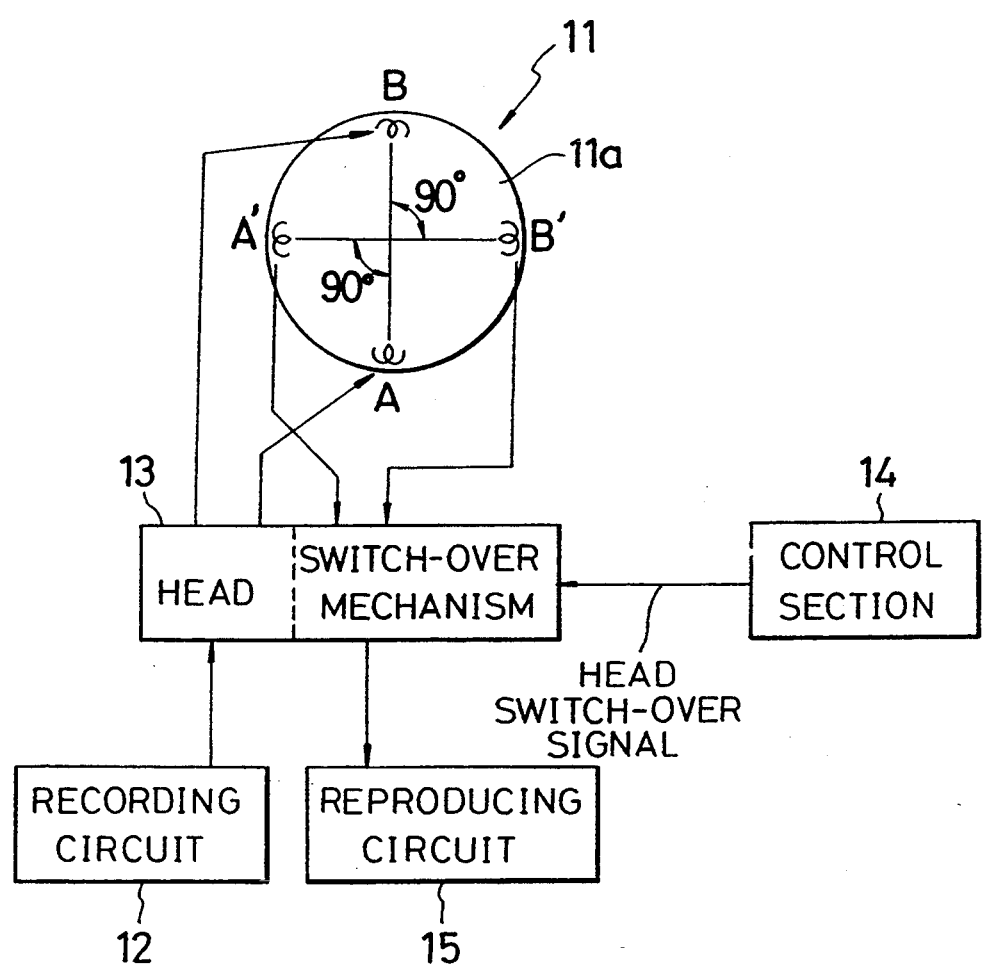
FIG. 4 is a block diagram of a second preferred embodiment of the invention illustrating in particular the positional relationship between the drum and the magnetic tape.
Figure 6:
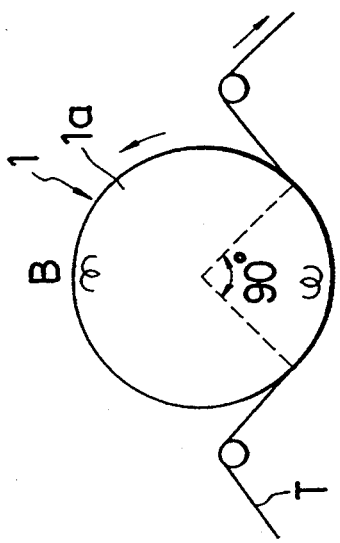
FIG. 6 is a schematic plan view of the drum of a conventional rotary head type magnetic recording/reproducing unit showing the positional relationship between the drum and the magnetic tape.
Figure 7:
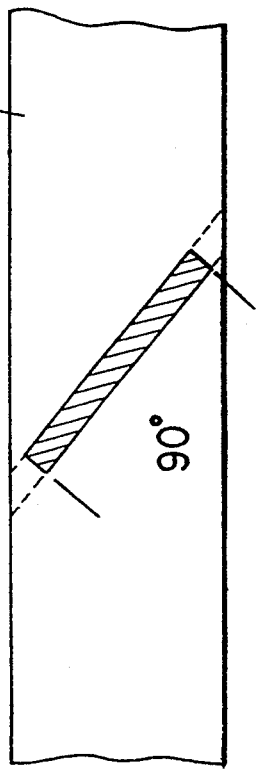
FIG. 7 is a partial plan view of a magnetic tape showing a signal recording area of the tape when it is used with the drum of FIG. 6.

FIG. 4 shows a block diagram of a second preferred embodiment of the invention illustrating in particular the positional relationship between the drum and the magnetic tape.

This embodiment comprises a rotary head assembly 11 having a rotary drum 11a which is provided with recording magnetic heads A, B as well as reproducing magnetic heads A', B', said four magnetic heads being arranged diametrically on the rotary drum 11a, each being angularly separated from the adjacent ones by 90°. The rotary drum 11a has a diameter of 30mm. FIG. 4 shows in block diagram the route of signals when the magnetic heads A and B carry out signal recording operations as well as when the magnetic heads A' and B' carry out signal reproducing operations. The signals transmitted for recording from the recording circuit 12 is divided into two groups by head switch-over mechanism 13, one to be recorded by the head A and the other to be recorded by the head B. The signals reproduced by the reproducing heads A' and B' are sent to reproducing circuit 15. Reference numeral 14 denotes a control section 14 for controlling the timing of head switch-over.

It should be noted that the central angle of the rotary drum 11a that corresponds to its peripheral area that contacts with the magnetic tape is similar to that of the first embodiment as shown in FIG. 1 and the central angle that corresponds to the peripheral area effective for signal recording is 90°, giving a leading marginal contact area $\theta 1$ and a trailing marginal contact area $\theta 2$ to each recording zone of the magnetic tape. In this second embodiment, $\theta 1$ and $\theta 2$ have an approximately same value, whose corresponding central angle will be greater than 1.5° and preferably greater than 3°. The upper limit of the angle for $\theta 1$ and $\theta 2$ is preferably somewhere between 15° and 19°.

FIG. 5(a) shows envelope waveforms of the signals recorded by the magnetic heads A and B, whereas FIG. 5(b) shows envelope waveforms of the signals reproduced by the heads A' and B'. In this embodiment, the head A remains active from a starting edge (a) to an ending edge (a1) that correspond respectively to those of a central angle of 90°, whereas the head B is active from a starting edge (b) to an ending edge (b1) corresponding respectively to those of a central angle of 90°. Similarly, the head A' stays active from the edge (a1) to the edge (b) that correspond respectively to those of a central angle of 90°, whereas the head B' is active from the edge (b1) to the edge (a) corresponding respectively to those of a central angle of 90°. Although one of the heads is in contact with the marginal contact areas $\theta 1$ and $\theta 2$ of the magnetic tape, no signal recording or reproducing operation is conducted in those areas, where the contact between the magnetic head and the tape is unstable because the head is either in the initial stages or in the final stages of contact, making envelope waveforms of signals free from distortion and deformation at the start and at the end.

While the rotary drum of each of the above embodiments has a diameter of 30mm and therefore it is in contact with the magnetic tape for a central angle of 90°, a typical drum configuration of a DAT machine, the drum diameter and the central angle for a span of its periphery to be in contact with a magnetic tape may be modified without departing the spirit and the scope of the present invent ion.

Moreover, while only a large starting marginal contact area $\theta 1$ is provided before each recording zone of a magnetic tape for the first embodiment, a trailing marginal contact area which is as large as $\theta 1$ may also be arranged after each recording zone of the magnetic tape.

As is apparent from the above description, each of the magnetic heads of a rotary head type magnetic recording/reproducing unit according to the invention is made inactive for both signal recording and reproduction for a certain period of time until the start or after the end or both until the start and after the end of each recording or reproducing operation to be carried out by it, although the head is in contact with a magnetic tape during that period so that the signal recording or reproducing operation can be conducted under a condition where the tape and the magnetic head are stably in contact with each other and therefore any distorted or deformed envelope waveforms may be eliminated.

Moreover, the rotary drum of a rotary head type magnetic recording/reproducing unit according to the invention is kept in contact with a magnetic tape for a span of its periphery which is greater than the span that covers a signal recording or reproducing zone of a magnetic tape to provide marginal contact areas for the zone. Consequently, the position of the tape loading post for bringing the magnetic tape into contact with the drum may be appropriately determined within a relatively large allowable range, leaving a considerable freedom for the layout of the machine and eliminating possible operational interferences among components.

What is claimed is:

1. A rotary head type magnetic recording/reproducing unit for reading from or writing to a magnetic tape, the magnetic tape having first and second parallel edges, the magnetic tape including an elongated data storage area arranged ion a diagonal direction with respect to the first and second parallel edges, the data storage area having first and second ends which define a length of the data storage area measured in the diagonal direction, said unit comprising:

a drum for receiving in close contact the magnetic tape on its periphery such that the magnetic tape is wrapped on a contact portion of the periphery of the drum, and a pair of magnetic heads arranged on said drum for running slantly on the magnetic tape for recording to or reproducing from the data storage area, wherein a span of the contact portion of the drum's periphery and the magnetic tape is greater than the length of the data storage area of the magnetic tape, whereby the magnetic head initially contacts the tape at a first point between the first edge of the magnetic tape and the first end of the data storage area, travels along the length of the data storage area to the second end, and is separated from the magnetic tape at a second point located between the second end of the data storage area and the second edge of the magnetic tape, and wherein the distance between the first point and the first end of the data storage area is sufficient to allow distortion to settle, the distortion being caused by the initial contact between the magnetic head and the tape, the distance also being sufficient to perform a switching operation, after the distortion has settled, whereby the magnetic head is connected to recording/reproducing circuitry.

2. A rotary head type magnetic recording/reproducing unit for reading from or writing to a magnetic tape, the magnetic tape having first and second parallel edges, the magnetic tape including a plurality of parallel elongated data storage areas arranged in a diagonal direction with respect to the first and second parallel edges, each data storage area having first and second ends which define a length of the data storage area measured in the diagonal direction, said unit comprising:

a drum for receiving in close contact the magnetic tape on its periphery such that the magnetic tape is wrapped on a contact portion of the periphery of the drum, and a pair of magnetic heads arranged on said drum for running slantly on the magnetic tape for recording to or reproducing from the data storage areas, wherein each data storage area includes a starting marginal contact area located between the first edge of the magnetic tape and the first end of the data storage area, and a trailing marginal contact area located between the second edge of the magnetic tape and the second end of the data storage area, wherein a span of the contact portion of the tape in contact with the drum is greater than the length of one of the data storage areas such that the magnetic head initially contacts the magnetic tape in the starting margin contact area and is separated from the magnetic tape from the trailing margin contact area, and wherein a distance between a first point of contact in each starting margin contact area and the first end of an associated data storage area is sufficient to allow distortion to settle, the distortion being caused by the initial contact between the magnetic head and the tape, the distance also being sufficient to perform a switching operation, after the distortion has settled, whereby the magnetic head is connected to recording/reproducing circuitry.

3. A magnetic recording/reproducing system for reading from or writing to a magnetic tape, the magnetic tape having first and second parallel edges, the magnetic tape including an elongated data storage area arranged in a diagonal direction with respect to the first and second parallel edges, the data storage area having first and second ends which define a length of the data storage area measured in the diagonal direction, said system comprising:

a drum for receiving the magnetic tape on its periphery;

a plurality of magnetic heads arranged on said drum, the magnetic heads for performing recording operations and reproducing operations on the data storage area of the magnetic tape as the drum is rotated, wherein the recording and reproducing operations are performed within a fixed central angle of rotation of the drum corresponding to the length of the data storage area; and loading means for wrapping a magnetic tape in contact with the drum around a portion of the periphery of the drum, wherein a span of contact between the periphery of the drum and the magnetic tape covers an angle greater than the fixed central angle by an amount sufficient to allow the magnetic heads to be connected to recording/reproducing circuitry after initial contact between the magnetic heads and the magnetic tape and before the magnetic heads are located over the data storage area, thereby preventing distorted recording and reproducing caused by unstable contact between the tape and the drum.

4. The magnetic recording/reproducing system of claim 3 wherein:

the drum has a diameter of 33 mm;

the fixed central angle is 90 degrees; and the angle formed by the span of contact of the periphery of the drum and the magnetic tape is between 96 degrees and 132 degrees.

5. The magnetic recording/reproducing system of claim 4 wherein the angle formed by the span of contact of the periphery of the drum and the magnetic tape is 128 degrees.

6. The magnetic recording/reproducing system of claim 3 wherein the span of contact between the periphery of the drum and the magnetic tape comprises:

a central contact area corresponding to the fixed central angle such that recording operations and reproducing operations on the data storage area of the magnetic tape are performed in the central contact area;

a starting marginal contact area adjacent to the central contact area; and a trailing marginal contact area adjacent to the central contact area such that the central contact area is between the starting marginal contact area and the trailing marginal contact area.

7. The magnetic recording/reproducing system of claim 6 wherein:

the drum has a 30 mm diameter;

the fixed central angle is 90 degrees;

the starting marginal contact area covers an angle of between 3 degrees and 20.3 degrees; and the trailing marginal contact area covers an angle of between 3 degrees and 20.3 degrees.

8. The magnetic recording/reproducing system of claim 3, further comprising means for placing a magnetic head in a recording or reproducing state after the magnetic head comes into contact with a magnetic tape, so that the magnetic head, while in contact with the magnetic tape, travels through a margin angle before being placed in the recording or reproducing state.

9. The magnetic recording/reproducing system of claim 3, further comprising means for removing a magnetic head from a recording or reproducing state before the magnetic head is moved away from a magnetic tape, so that the head, while in contact with the magnetic tape, travels through a margin angle after being removed from the recording or reproducing state.

10. The magnetic recording/reproducing system of claim 3, further comprising means for placing a magnetic head in a recording or reproducing state after the magnetic head comes into contact with a magnetic tape and for removing the magnetic head from the recording or reproducing state before the magnetic head is moved away from a magnetic tape, so that the magnetic head, while in contact with the magnetic tape, travels through a first margin angle before being placed in the recording or reproducing state, travels through the fixed central angle while in the recording or reproducing state, and travels through a second margin angle after being removed from the recording or reproducing state.

11. A method for reading to or writing from a magnetic tape using a rotary head-type recording/reproducing device, the device including a rotating cylindrical drum having a peripheral surface and a magnetic head mounted adjacent the peripheral surface, the magnetic tape having first and second parallel edges and including a plurality of parallel elongated data storage areas arranged in diagonal directions with respect to the first and second parallel edges, each data storage area having first and second ends which define a length of the data storage area measured in the diagonal direction, said method comprising the steps of:

training the magnetic tape over a portion of the periphery of the drum such that an amount of the magnetic tape in contact with the periphery of the drum, measured in the diagonal direction, is greater than the length of the data storage area, and such that the magnetic head initially contacts the magnetic tape at a first point between the first edge of the magnetic tape and the first end of the data storage area, travels along the length of the data storage area to the second end, and is separated from the magnetic tape at a second point located between the second end of the data storage area and the second edge of the magnetic tape; and connecting the magnetic head to recording/reproducing circuitry after the magnetic head initially contacts the magnetic tape and before the magnetic head contacts the first end of the data storage area, the connecting step being performed a sufficient time after the initial contact to allow magnetic head signal distortions to settle, the distortions being caused by the initial contact of the magnetic head and the magnetic tape.

12. The method of claim 11 further comprising the step of:

disconnecting the magnetic head from the recording/reproducing circuitry after the magnetic head passes the second end of the data storage area and before the magnetic head is separated from the magnetic tape.

* * * * *